L. M. BOOTH.
APPARATUS FOR PURIFYING LIQUIDS.
APPLICATION FILED JUNE 30, 1914.

1,177,167.

Patented Mar. 28, 1916.
2 SHEETS—SHEET 1.

Inventor
LEVIS M. BOOTH

Witnesses

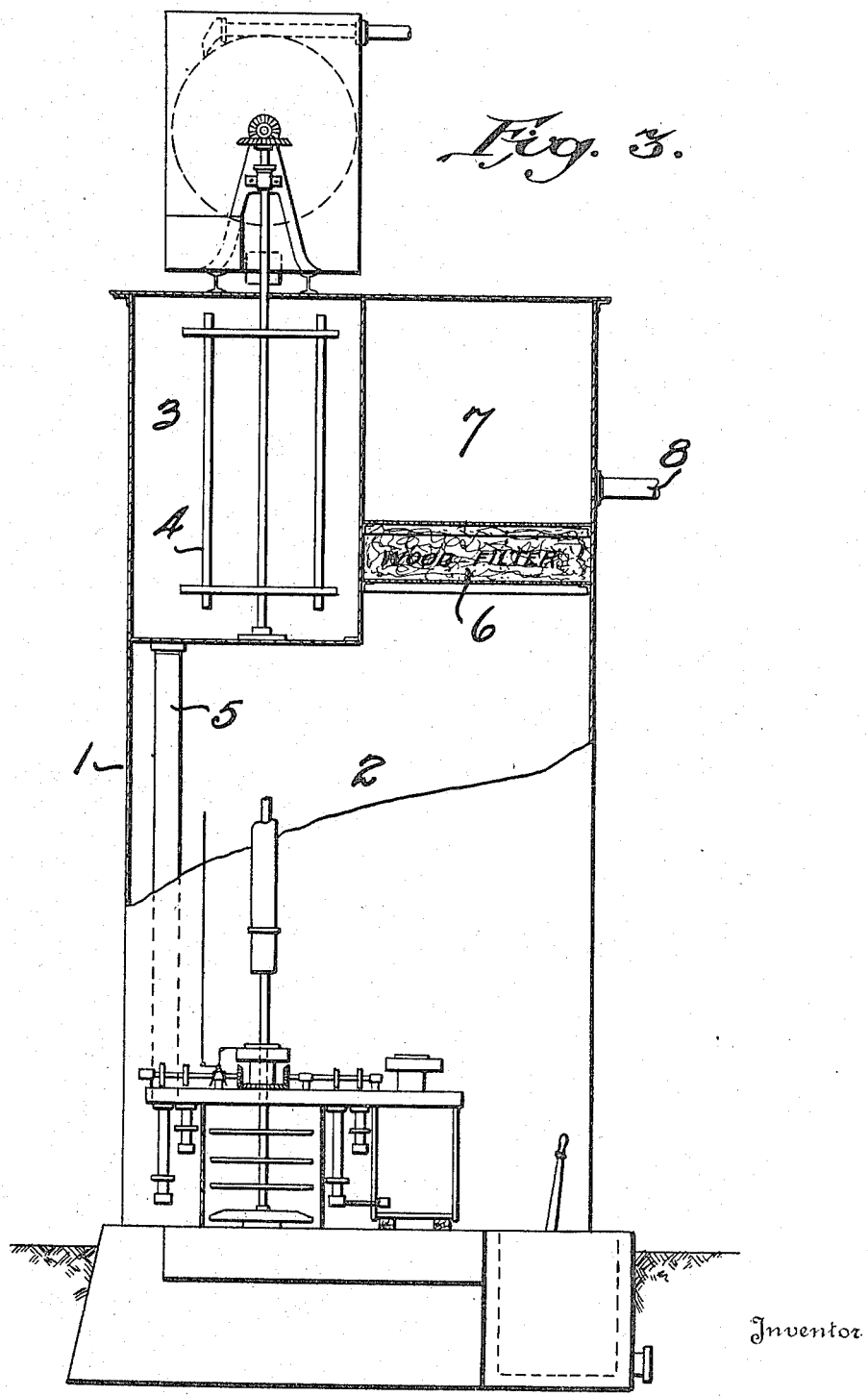

UNITED STATES PATENT OFFICE.

LEVIS MILLER BOOTH, OF PLAINFIELD, NEW JERSEY.

APPARATUS FOR PURIFYING LIQUIDS.

1,177,167. Specification of Letters Patent. Patented Mar. 28, 1916.

Application filed June 30, 1914. Serial No. 848,275.

*To all whom it may concern:*

Be it known that I, LEVIS MILLER BOOTH, a citizen of the United States, and a resident of Plainfield, in the county of Union and State of New Jersey, have invented certain new and useful Improvements in Apparatus for Purifying Liquids, of which the following is a specification.

My invention relates to improvements in apparatus for purifying liquids, and the object of my invention is to provide an apparatus in the form of a cylindrical tank which shall contain the softening or mixing chamber and settling chamber, and in which practically the entire area of the lower portion of the cylindrical tank shall form a capacious settling chamber of large cross sectional area so that the upward flow of the liquid through the settling chamber may be as slow as possible in order to permit the fine precipitate to settle rather than to be carried upward by the upward flow of the liquid.

Figure 1:
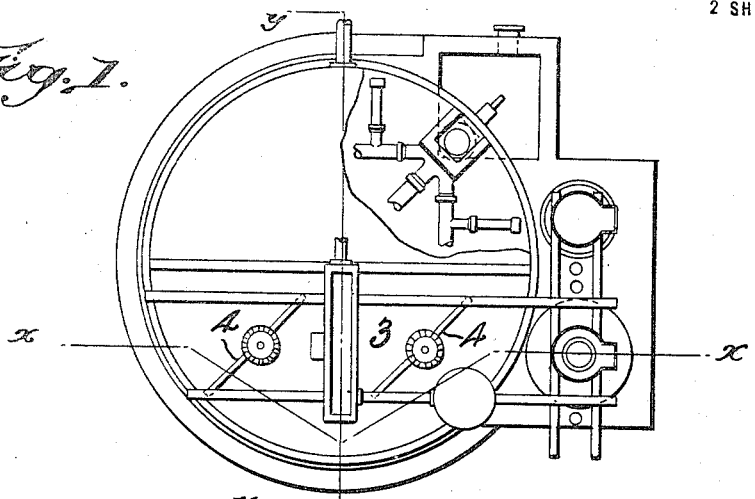
Figure 2:
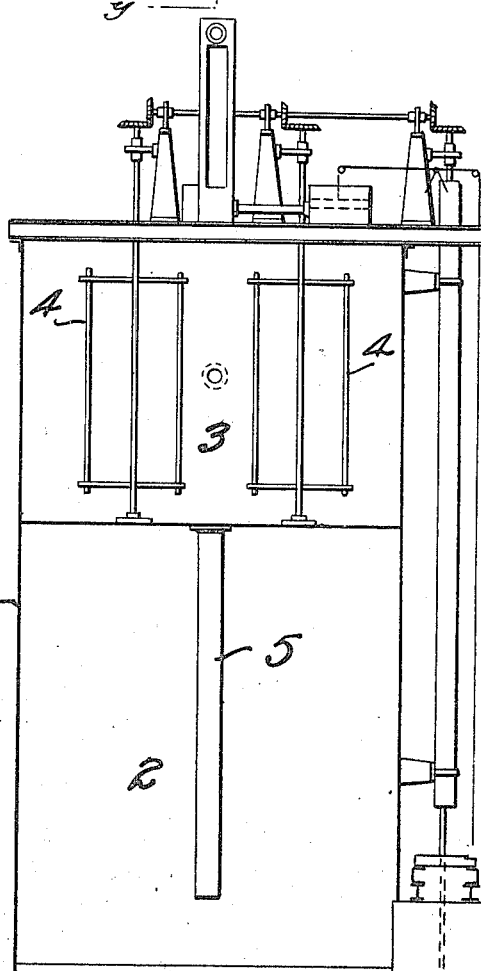

In the accompanying drawing, Figure 1 is a plan view of my apparatus; Fig. 2 is an elevation part'y in section of my apparatus; and Fig. 3 is a partial sectional view on the line $y-y$ of Fig. 1.

Similar numerals refer to similar parts throughout the accompanying drawing.

It will be understood that many changes may be made in the apparatus without departing from the spirit or scope of my invention.

The apparatus shown in the drawing is particularly adapted to the treatment of water, and consists of a cylindrical tank 1, the lower portion of which forms the settling chamber 2. In the upper portion of this tank is the softening or mixing chamber 3 provided with the agitators 4, and a conduit or pipe 5 of such dimensions and capacity that the treated liquid will be discharged from the softening chamber into the settling chamber near the bottom thereof at a rate of flow which will not cause undue agitation of the liquid in the settling chamber. Near the upper end of the settling chamber, I have provided a filter 6, through which the purified water passes into the storage chamber 7, which is provided with a discharge outlet 8. By this construction practically the entire area of the lower portion of the tank 1 is available to provide a large and capacious settling tank of large cross sectional area, and, therefore, the upward flow of water through the settling tank is as slow as possible in a tank of a given diameter, thus permitting the fine precipitate to settle rather than be carried upward by the upward flow of the water, and the dimensions of the filter, while adequate for the purpose, are reduced to a minimum. I find in practice that with the apparatus constructed as shown and described the quantity of water which can be successfully treated is greater in a given time than with a cylindrical tank apparatus of the style heretofore in use, as the capacity of the purifying apparatus is dependent upon the cross-sectional area of the settling tank, which determines the rate of upward flow of the water therethrough, which must be at a slower speed than the downward travel of the fine particles of precipitate suspended in water.

From the foregoing description, it will be apparent that the present invention involves the novel feature of providing a reaction compartment within the main tank, so that one wall of the latter forms a wall of the tank, while the opposite wall designated as $4^a$ coöperates with the cylinder wall to provide a segmental compartment 3 which is located near the upper end of the main tank. This location and arrangement of the reaction compartment thus provides a capacious and unobstructed settling space at the bottom of the main tank which is of large cross sectional area and into which leads the conduit 5 from the reaction compartment. This conduit has its discharge end close to the bottom of the settling space 2, so that the softened water and insoluble particles issuing from the reaction compartment 3 will be fed into the settling space in a substantially inert condition, to thus provide for the effective separation by gravity of the heavy insoluble particles and collection of sludge while the lighter liquid rises to the top of the tank and passes out through the wood filter 6.

The balance of the apparatus is too well known to need further description.

Having described my invention, what I claim as new and desire to secure by Letters Patent is:

1. An apparatus for purifying liquids comprising a cylindrical tank, a segmental reaction compartment formed entirely within said cylindrical tank at the upper end thereof, a settling space of relatively large cross sectional area, formed by the lower portion of said cylindrical tank, and a conduit of lesser cross sectional area than said segmental reaction compartment for conveying the liquid therefrom to a point near the bottom of the settling space.

2. An apparatus for purifying liquids comprising a cylindrical tank, a reaction or mixing compartment consisting of a section of the upper portion of said cylindrical tank, the cylindrical wall of said cylindrical tank forming one of the walls of said reaction or mixing compartment, a settling compartment consisting of the lower portion of said cylindrical tank, and a conduit of lesser cross-sectional area than the cross-sectional area of said reaction or mixing compartment for conveying the liquid from the mixing or reaction compartment to a point near the bottom of the settling compartment.

Signed at New York city, in the county of New York and State of New York this 15th day of June, A. D. 1914.

LEVIS MILLER BOOTH.

Witnesses:
  EDWARD H. WILSON,
  VIOLA E. HUGHES.